US007127571B2

(12) United States Patent
Grover et al.

(10) Patent No.: US 7,127,571 B2
(45) Date of Patent: Oct. 24, 2006

(54) METHOD AND SYSTEM TO ADJUST NON-VOLATILE CACHE ASSOCIATIVITY

(75) Inventors: Andrew S. Grover, Beaverton, OR (US); Jeanna N. Matthews, Massena, NY (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 10/750,040

(22) Filed: Dec. 30, 2003

(65) Prior Publication Data

US 2005/0144359 A1 Jun. 30, 2005

(51) Int. Cl.
*G06F 12/16* (2006.01)

(52) U.S. Cl. ........................ 711/156; 711/100; 711/102; 711/103; 711/111; 711/113; 711/114; 711/128; 713/300; 713/320; 713/330; 713/340

(58) Field of Classification Search ........ 711/112–113, 711/128, 156
See application file for complete search history.

(56) References Cited

U.S. PATENT DOCUMENTS 5,537,360 A * 7/1996 Jones et al. ................. 365/226
5,732,238 A * 3/1998 Sarkozy ...................... 711/135
6,052,789 A * 4/2000 Lin ............................ 713/300
6,452,823 B1 * 9/2002 Naji ............................ 365/50
6,711,043 B1 * 3/2004 Friedman et al. ............. 365/51
6,957,355 B1 * 10/2005 Acton et al. ................ 713/340
2004/0230848 A1 * 11/2004 Mayo et al. ................ 713/320

* cited by examiner

*Primary Examiner*—Matthew Kim
*Assistant Examiner*—Zhuo H. Li
(74) *Attorney, Agent, or Firm*—Blakely, Sokoloff, Taylor & Zafman LLP

(57) ABSTRACT

A method and system to adjust a non-volatile cache associativity are described. In one embodiment, the method and system include determining a status of the system; and setting an associativity level of the non-volatile memory cache (NVC) of the system, based on that status of the system. In one embodiment, the non-volatile memory unit is a cache of the hard disk. Furthermore, in one embodiment, determining the status of the system includes determining whether the system is a mobile computer, and if so, determining whether the system is receiving power from a battery source or AC power from a wall outlet.

15 Claims, 3 Drawing Sheets

METHOD AND SYSTEM TO ADJUST NON-VOLATILE CACHE ASSOCIATIVITY

NOTICE OF RELATED APPLICATIONS

This application is related to copending patent application titled METHOD AND APPARATUS TO SPIN UP A DISK DRIVE PRIOR TO A DISK DRIVE DATA EXCHANGE REQUEST, patent application Ser. No. 10/750,037 filed Dec. 30, 2003, copending patent application titled METHOD AND APPARATUS TO SAVE HISTORICAL HARD DISK PERFORMANCE DATA, patent application Ser. No. 10,749,815 filed Dec. 30, 2003, and copending patent application titled METHOD AND SYSTEM TO CHANGE A POWER STATE OF A HARD DRIVE, patent application Ser. No. 10/749,756 filed Dec. 30, 2003.

FIELD OF INVENTION

The field of invention relates generally to data processing; and, more specifically, to a method and system to adjust non-volatile cache associativity.

BACKGROUND

A hard disk may be provided with a cache for the hard disk, typically found in random access memory (RAM), to cache data that has been read from the hard disk. However, because the hard disk cache is located in the RAM, data which is to be written to the hard disk is unable to be cached in the cache of the hard disk, because if the computer system were to fail the data to be written to the hard disk would be lost due to the loss of power to the RAM.

In addition, for mobile computers, repeatedly accessing the hard disk is a power consuming activity that involves a power management policy that attempts to reduce the frequency of spinning up the hard disk and the continued use of the hard disk.

DETAILED DESCRIPTION

A method and system to adjust a non-volatile cache associativity are described. In one embodiment, the method and system include determining a status of the system; and setting an associativity level of a non-volatile memory cache (NVC) of the system, based on that status of the system. In one embodiment, the non-volatile memory unit is a cache of the hard disk. Furthermore, in one embodiment, determining the status of the system includes determining whether the system is a mobile computer, and if so, determining whether the system is receiving power from a battery source or AC power from a wall outlet.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In addition, as described herein, a trusted platform, components, units, or subunits thereof, are interchangeably referenced as a protected or secured.

Figure 1:
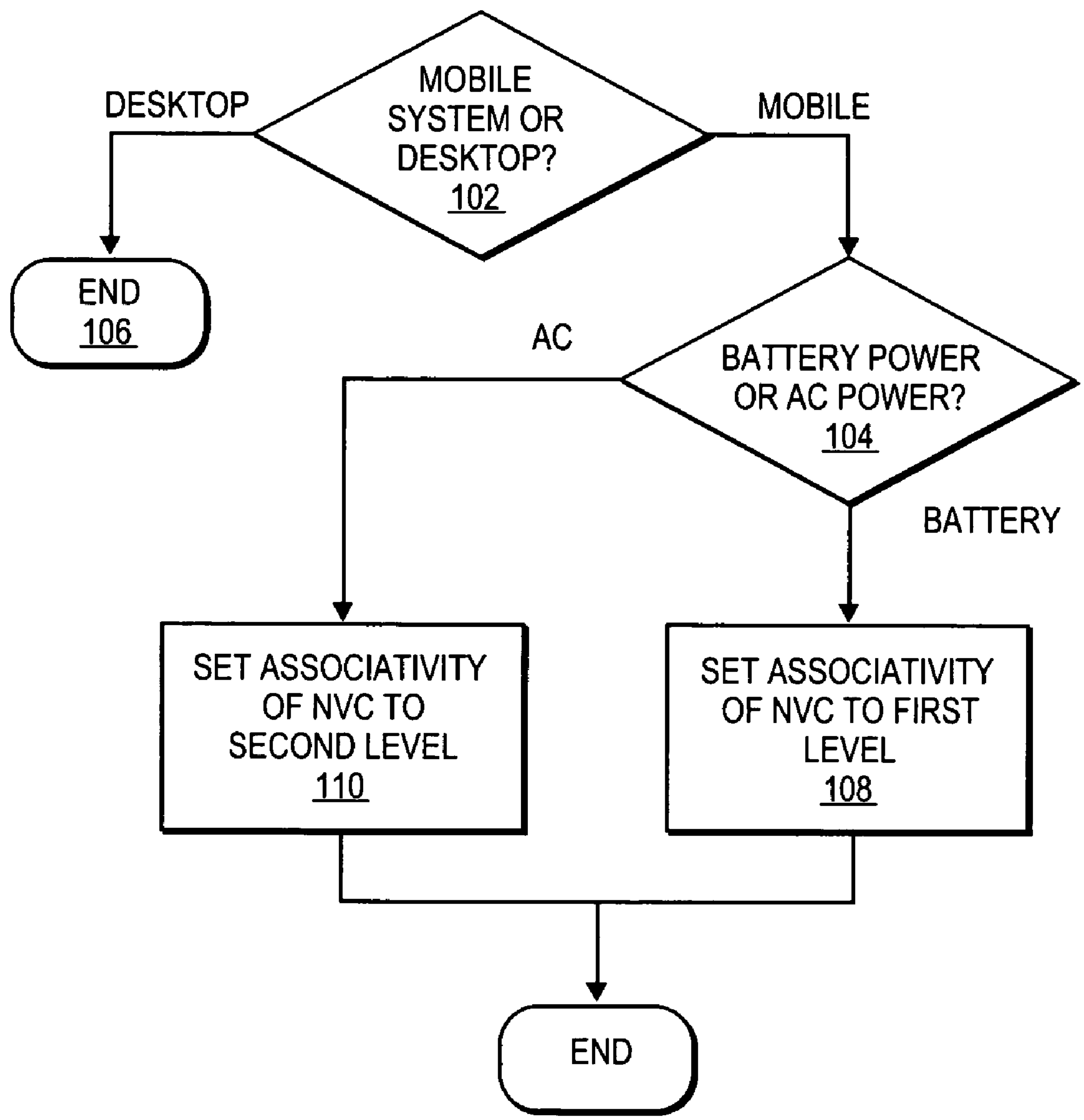
FIG. 1 presents a flow diagram describing the processes of adjusting a non-volatile cache associativity according to one embodiment.
Figure 2:
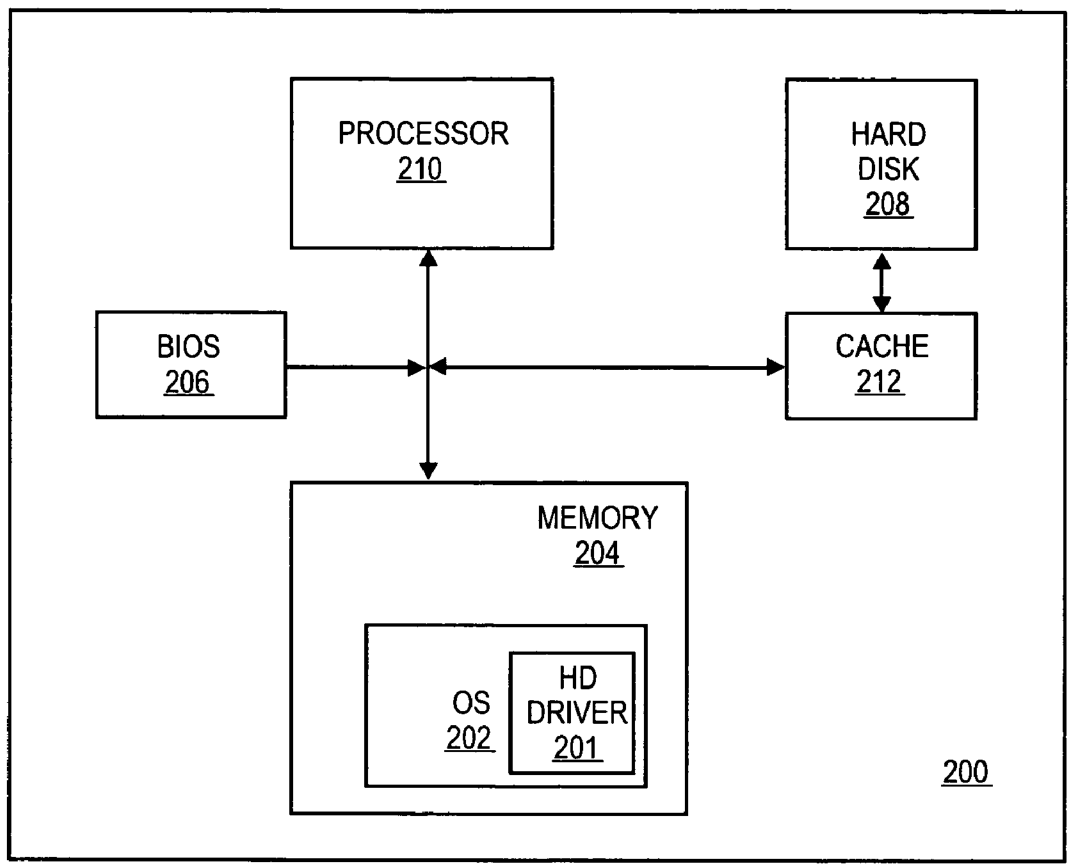
FIG. 2 presents a diagram of a system to adjust a non-volatile cache associativity according to one embodiment.

FIG. 1 presents a flow diagram describing the processes of adjusting a non-volatile cache associativity according to one embodiment. The flow diagram is described with reference to the computer system 200 illustrated in the diagram of FIG. 2.

In process 102, a status of system 200 is determined, which includes determining whether system is mobile computer or a stationary computer, such as desktop computer. If the system is determined to be a mobile computer, in process 104 determining the status of the system 200 continues by determining the power source of the system 200. In particular, the power source of system 200 is determined to be either power from a battery source or power from an AC, typically from a wall outlet. If the system is determined to be a stationary computer, in process 106, the process of adjusting the associativity level of the non-volatile cache is complete.

In one embodiment, a driver 201 of the hard drive (HD), for which the NVC 212 serves as a cache, determines the status of the system by reading the BIOS 206 of the system. Alternatively, the operating system (OS) 202 of the system 200 may read the BIOS 206 and communicate the status to the driver 212. Furthermore, in one embodiment, driver 212 or the OS 202 would read a register of the processor 210 or a register of voltage regulator to determine the power source of the system 200.

If the power source of the system is determined to be from a battery, in process 108, the associativity of the NVC is set to a first level. If the power source of the system is determined to be AC power, typically from a wall outlet, in process 110, the associativity of the NVC is set to a second level.

In one embodiment, the associativity of the first level is greater than the associativity level of the second level. In one embodiment, the associativity of the first level may range from a 6 way or greater set associative cache to a fully associative cache. The associativity of the second level may range from a 4 way or less set associative cache to a direct mapped cache. As a result, when the associativity of the NVC is set to the first level there will be a higher probability, relative to the second level, of having a cache hit during a search of the NVC, thereby avoiding the power consuming activity of spinning up the HD to access the desired data. In alternative embodiments, the level of associativity within the first and second levels may vary or include other levels of associativity other than the levels described above.

In one embodiment, process described above may occur dynamically while the system 200 is active, and/or the process may occur following a rebooting of the system, during an activity such as the HD driver initialization. Furthermore, the process of determining the status of the system to determine the desired associativity level of the NVC may involve other factors in addition to, or in place of, determining the power source of the system 200. For example, the process of determining the status may include determining one of a variety of factors that aids in determining the relative importance of power vs. performance, such as the needs of an applications being executed.

Figure 3:
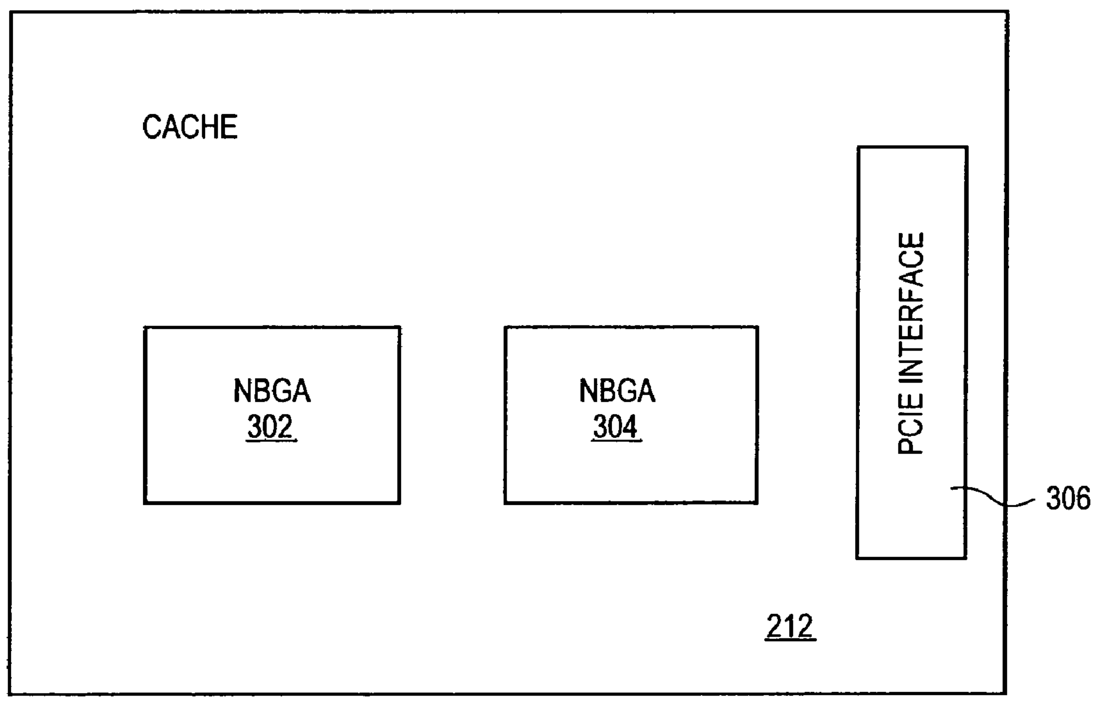
FIG. 3 presents a diagram of a non-volatile cache used according to one embodiment.

In one embodiment, as stated above, the NVC 212 is a cache of the HD 208. FIG. 3 illustrates the NVC according to one embodiment. In one embodiment, the cache 212 of the hard disk 208 is a thin film electronics memory made of Ferroelectrics polymer with multiple layers stacked on top of a complimentary metal oxide semiconductor (CMOS). In one embodiment, the cache 212 of the hard disk 208 has a 512 megabyte (mb) capacity. In one embodiment, the cache comprises two 256 mb micro Ball Grid Arrays (BGA) 302, 304. In one embodiment, the cache 212 includes a form factor of a Mini Peripheral Component Interconnect Express (PCIE) card, and also includes PCIE interface 306. In alternative embodiments, the cache 212 may be made of alternative materials, consist of an alternative capacity, an alternative form factor, and/or and alternative interface.

The processes described above can be stored in the memory of a computer system as a set of computer-readable instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a hard disk (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. For example, the non-volatile memory unit, as described herein, may be used as a cache for other components within a system, other than the HD. The specification and drawings are, accordingly, to be regarded in an illustrative rather than a restrictive sense.

The invention claimed is:

1. A method comprising:

determining a status of a system;

setting an associativity level of a non-volatile memory unit of the system, based on the status of the system, wherein the non-volatile memory unit is a cache for a hard disk of the system and in response to determining the system is receiving power from a battery power source, setting the associativity level to a first level of associativity, the first level of associativity includes greater associativity than a second level of associativity.

2. The method of claim 1, wherein in response to determining the system is receiving AC power from a wall outlet, setting the associativity level to the second level of associativity.

3. The method of claim 2, wherein the first level of associativity is at least a 6 way set associative cache.

4. The method of claim 2, wherein the second level of associativity is a 4 way set associative cache.

5. The method of claim 1, wherein the second level of associativity is a 2 way set associative cache.

6. A machine-readable medium having stored thereon a set of instructions which when executed cause a system to perform a method comprising of:

determining a status of a system;

setting an associativity level of a non-volatile memory unit of the system, based on the status of the system, wherein the non-volatile memory unit is a cache for the hard disk and in response to determining the system is receiving power from a battery power source, setting the associativity level to a first level of associativity, the first level of associativity includes greater associativity than a second level of associativity.

7. The machine-readable medium of claim 6, wherein in response to determining the system is receiving AC power from a wall outlet, setting the associativity level to the second level of associativity.

8. The machine-readable medium of claim 6, wherein the first level of associativity is at least a 6 way set associative cache.

9. The machine-readable medium of claim 6, wherein the second level of associativity is a 4 way or less set associative cache.

10. The machine-readable medium of claim 6, wherein the second level of associativity is a 2 way set associative cache.

11. A system comprising:

a processor;

a non-volatile cache coupled to the processors, wherein the non-volatile cache is a cache for a hard disk of the system; and a machine having stored thereon a set of instructions which when executed cause the system to perform a method comprising of:

determining a status of the system;

setting an associativity level of the non-volatile cache of the system, based on the status of the system, wherein in response to determining the system is receiving power from a battery power source, setting the associativity level to a first level of associativity, the first level of associativity includes greater associativity than a second level of associativity.

12. The system of claim 11, wherein in response to determining the system is receiving AC power from a wall outlet, setting the associativity level to the second level of associativity.

13. The system of claim 12, wherein the first level of associativity is at least a 6 way set associative cache.

14. The system of claim 12, wherein the second level of associativity is a 4 way or less set associative cache.

15. The system of claim 12, wherein the second level of associativity is a 2 way set associative cache.

* * * * *